US011332154B2

(12) United States Patent
Michaelsen

(10) Patent No.: US 11,332,154 B2
(45) Date of Patent: May 17, 2022

(54) METHOD FOR DETERMINING JUMPS AND/OR BREAK POINTS IN AN ACTUATION CHARACTERISTIC OF AN ACTUATION UNIT, EVALUATION MODULE AND VEHICLE

(71) Applicant: ZF CV Systems Hannover GmbH, Hannover (DE)

(72) Inventor: Arne Michaelsen, Seelze (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/202,485

(22) Filed: Mar. 16, 2021

(65) Prior Publication Data

US 2021/0197842 A1 Jul. 1, 2021

Related U.S. Application Data

(63) Continuation of application No. PCT/EP2019/071947, filed on Aug. 15, 2019.

(30) Foreign Application Priority Data

Sep. 17, 2018 (DE) ..................... 10 2018 122 664.0

(51) Int. Cl.

*B60W 50/04* (2006.01)
*B60W 10/04* (2006.01)
*B60W 10/18* (2012.01)

(52) U.S. Cl.

CPC .......... *B60W 50/045* (2013.01); *B60W 10/04* (2013.01); *B60W 10/18* (2013.01)

(58) Field of Classification Search

CPC .. B60T 2220/04; B60T 7/02; B60T 2270/413; F02D 41/2432; F02D 11/106;

(Continued)

(56) References Cited

U.S. PATENT DOCUMENTS 7,365,769 B1 * 4/2008 Mager ...................... B60Q 1/44 340/467
8,340,863 B2 * 12/2012 Karatsinides .......... B60K 26/02 701/36

(Continued)

FOREIGN PATENT DOCUMENTS

AU 2018282491 B1 * 10/2019
CA 3018722 A1 * 3/2020 ............. B60T 8/175

(Continued)

*Primary Examiner* — Atul Trivedi

(74) *Attorney, Agent, or Firm* — Leydig, Voit & Mayer, Ltd.

(57) ABSTRACT

A method for determining jumps and/or inflection points in an activation characteristic of an activation unit includes activating the activation unit using an activator, wherein different activation areas, separated from one another by the jumps and/or inflection points, are defined by the activation characteristic. Different activation forces for activating the activator are respectively set in the activation areas. The jumps and/or inflection points are determined by activating the activator by continuously determining activation travel values of the activator, respectively assigning an activation speed characteristic variable to the determined activation travel values, continuously forming value pairs from the determined activation travel value and the assigned activation speed characteristic variable, and checking, based on the value pairs which are formed whether significant changes occur in the activation speed. The jumps and/or inflection points in the activation characteristic are assigned to activation travel values at which significant changes occur in activation speed.

20 Claims, 3 Drawing Sheets vB
2c
sB
2d
SXB
2e
1
2b
2a
2h
FK,F
2
KB
BB
2f
2g
4
KB
KA
3b
vA
3c
3d
3e
3a
3h
sA
SXA
FK,F
KA
BA
3f
3g
3

(58) Field of Classification Search

CPC ........... B60K 2026/023; B60K 26/021; B60W 50/045; B60W 10/04; B60W 10/18; G05G 5/03; G05G 1/30

USPC ........................................................ 701/32.7

See application file for complete search history.

(56) References Cited

U.S. PATENT DOCUMENTS

| | | | | |
|---|---|---|---|---|
| 8,457,840 | B2 | 6/2013 | Schmidt et al. | |
| 9,182,774 | B2 | 11/2015 | Drews et al. | |
| 2002/0108816 | A1* | 8/2002 | Taniguchi | B60T 13/746 188/2 R |
| 2002/0179355 | A1* | 12/2002 | Kurz | B60T 7/22 180/169 |
| 2004/0024504 | A1* | 2/2004 | Salib | B60R 21/0132 701/38 |
| 2004/0024505 | A1* | 2/2004 | Salib | B60G 17/0162 701/38 |
| 2004/0024509 | A1* | 2/2004 | Salib | B60T 8/17555 701/45 |
| 2005/0060069 | A1* | 3/2005 | Breed | G08G 1/164 701/408 |
| 2006/0052917 | A1* | 3/2006 | Schwarzhaupt | B60W 10/18 701/31.4 |
| 2008/0277230 | A1* | 11/2008 | Youtt | B60W 30/1843 192/57 |
| 2013/0178333 | A1* | 7/2013 | Plath | F16H 61/0213 477/94 |
| 2013/0338894 | A1* | 12/2013 | Olofsson | B60T 7/042 701/70 |
| 2015/0233289 | A1* | 8/2015 | Younkins | F02D 41/1498 73/114.79 |
| 2017/0001615 | A1* | 1/2017 | Adler | B60T 7/042 |
| 2017/0037959 | A1* | 2/2017 | Pflueger | F16H 61/0213 |
| 2018/0154880 | A1* | 6/2018 | Wolff | B60T 13/741 |
| 2019/0111790 | A1* | 4/2019 | Crombez | B60L 7/26 |
| 2019/0121350 | A1* | 4/2019 | Celia | H04L 67/12 |
| 2021/0033156 | A1* | 2/2021 | Resvoll | F16D 48/06 |

FOREIGN PATENT DOCUMENTS

| | | | | |
|---|---|---|---|---|
| DE | 4341245 | A1 | 6/1995 | |
| DE | 19624788 | A1 | 1/1998 | |
| DE | 102004009846 | A1 | 9/2005 | |
| DE | 102005002265 | A1 | 8/2006 | |
| DE | 102010008741 | A1 | 11/2011 | |
| DE | 102011079375 | A1 | 4/2012 | |
| DE | 102014224234 | B3 | 1/2016 | |
| DE | 102015212024 | A1 | 12/2016 | |
| DE | 102015219303 | A1 | 4/2017 | |
| DE | 102016219622 | A1 | 4/2018 | |
| EP | 1459929 | A2 * | 9/2004 | B60K 31/042 |
| WO | WO-2013000042 | A1 * | 1/2013 | G05G 1/30 |
| WO | WO-2014027111 | A1 * | 2/2014 | F16H 61/0213 |
| WO | WO-2014114311 | A1 * | 7/2014 | B60W 10/184 |
| WO | WO-2016201010 | A1 * | 12/2016 | B60Q 9/008 |

* cited by examiner

METHOD FOR DETERMINING JUMPS AND/OR BREAK POINTS IN AN ACTUATION CHARACTERISTIC OF AN ACTUATION UNIT, EVALUATION MODULE AND VEHICLE

CROSS REFERENCE TO RELATED APPLICATIONS

This application is a continuation of International Patent Application No. PCT/EP2019/071947, filed on Aug. 15, 2019, which claims priority to German Patent Application No. DE 10 2018 122 664.0, filed on Sep. 17, 2018. The entire disclosure of both applications is hereby incorporated by reference herein.

FIELD

The present disclosure relates to a method for determining jumps and/or inflection points in an activation characteristic of an activation unit, to an evaluation module for carrying out the method, and to a vehicle.

BACKGROUND

In order to influence the driving dynamics of vehicles, foot-activated or manually activated activation units are provided which can be mechanically activated by a driver or in an automated fashion using an activation means, e.g. a foot-activated pedal or a manually activated lever. In this way, the driver can, for example, deflect a brake pedal or an accelerator pedal or a parking brake lever or an anti jack-knifing brake lever by a specific activation travel value, after which the vehicle is braked or accelerated in a corresponding fashion. For this purpose, the respective activation unit can electrically output activation signals which characterize the respective activation and which can be subsequently further processed by a control device (ECU). The control device can actuate, as part of an electrically controlled brake system, control valves or inlet/outlet valve combinations or electrical pressure modulators on the respective vehicle axles, for example by means of braking request signals, in order to bring about an electrically controlled braking operation corresponding to the brake pedal activation or the parking brake lever activation or anti-jackknifing brake lever activation. The control device can, as part of an electrically controlled drive system, correspondingly actuate a motor via drive request signals, in order to bring about acceleration of the vehicle which corresponds to the accelerator pedal activation.

In order to generate the activation signal, travel sensors, which measure the activation travel initiated by the driver or in an automated fashion, are conventionally arranged in the respective activation unit. The measured activation travel is subsequently adapted or calibrated by taking into account an activation characteristic, and as a function thereof a calibrated activation signal is output to the control device for implementation, wherein the control unit generates for this purpose the request signals from the calibrated activation signals. The activation characteristic is described here by means of a stored activation characteristic curve, wherein the activation characteristic curve follows, for example, from a spring characteristic curve which is defined by one or more springs which counteract the activation of the respective activation means to different extents. Therefore, the activation characteristic curve indicates what activation force the driver has to apply at a specific activation travel value.

In this context, a plurality of springs are conventionally combined with one another in order to obtain a combined spring characteristic curve, with the result that a specific pedal sensation or activation sensation can be achieved over a plurality of different activation ranges. This results in different activation forces in the respective activation ranges or at different activation travel values, which the driver also feels. Different vehicle reactions or changes in the vehicle movement dynamics can be defined for the individual activation ranges, which is already taken into account in the calibrated activation signal by means of the stored activation characteristic curve. In order to make this possible, jumps and/or inflection points or the transition areas in the spring characteristic curve between the individual activation ranges must be known and included in the profile of the activation characteristic curve. For this purpose, the activation characteristic curve is conventionally determined in advance on an individual basis for each activation unit at the end of the production line and stored in the respective activation unit, with the result that said activation unit can output, for implementation, a correspondingly calibrated activation signal in which jumps and/or inflection points are already taken into account.

This has the disadvantage that a time-consuming calibration process is necessary at the end of the production line for each activation unit, in order to produce the activation characteristic curve and to arrange an evaluation unit with a memory unit in each activation unit, in order to store the activation characteristic curve and process it together with the sensed activation travel values. This is the only way in which reliable operation can be ensured when the activation unit or the control device which processes the calibrated activation signals is replaced, since until now re-calibration has not been reliably possible in the vehicle. It is also disadvantageous that it is not possible to reliably react to a change in the activation characteristic curve during operation, e.g. owing to wear phenomena, since these changes cannot be detected.

SUMMARY

In an embodiment, the present invention provides a method for determining jumps and/or inflection points in an activation characteristic of an activation unit. The method includes activating the activation unit using an activator, wherein different activation areas, which are separated from one another by the jumps and/or inflection points, are defined by the activation characteristic. Different activation forces for activating the activator are respectively set in the activation areas. The jumps and/or inflection points are determined by activating the activator by continuously determining activation travel values of the activator, respectively assigning an activation speed characteristic variable to the determined activation travel values, continuously forming value pairs from the determined activation travel value and the assigned activation speed characteristic variable, and checking, based on the value pairs which are formed whether significant changes occur in the activation speed. The activation speed characteristic variable is formed as a function of an activation speed of the activator at the respective activation travel. The jumps and/or inflection points in the activation characteristic are assigned to the activation travel values at which significant changes occur in the activation speed.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
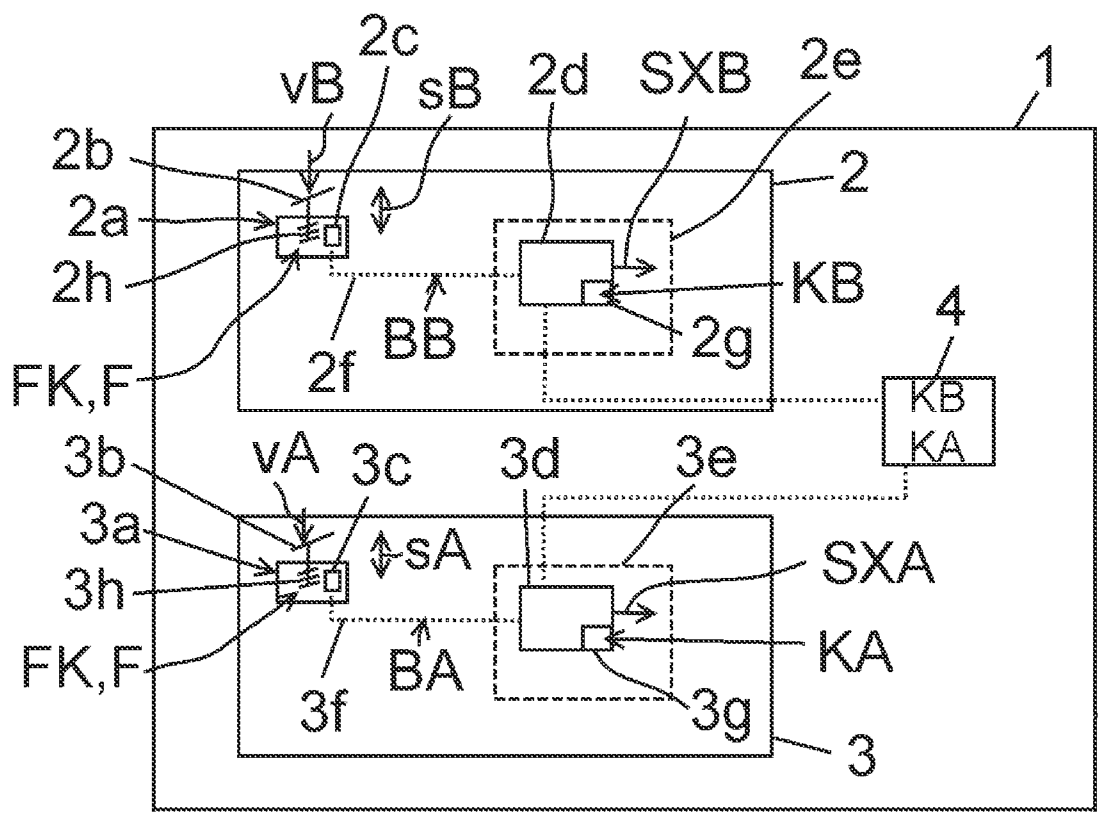
FIG. 1 illustrates a vehicle with a brake activation unit and a drive activation unit.

The present disclosure provides a method by which jumps and/or inflection points in an activation characteristic of an activation unit can be easily and reliably determined. The present disclosure also provides an evaluation module and a vehicle.

According to the present disclosure, jumps and/or inflection points in an activation characteristic of an activation unit are determined by at least single activation of an activation means of the activation unit in that:

- activation travel values of the activation means are continuously determined,
- an activation speed characteristic variable is respectively assigned to the determined activation travel values, with the result that value pairs are continuously formed from the determined activation travel value and the assigned activation speed characteristic variable, wherein the activation speed characteristic variable is formed as a function of the activation speed of the activation means at the respective activation travel, and
- on the basis of the value pairs which are formed it is checked whether significant changes occur in the activation speed, wherein jumps and/or inflection points in the activation characteristic are assigned to the activation travel values at which significant changes occur in the activation speed.

In this context, it is recognized that owing to a change in the activation characteristic in the jumps and/or inflection points a changed activation force is to be applied by the driver in order to activate the activation means. If the driver activates the activation means with a specific activation speed, he cannot however maintain this activation speed at the jumps or inflection points since he cannot immediately adapt the change in the activation force. Accordingly, a change occurs in the activation speed, and this can be detected by means of the activation speed characteristic variable. However, this can occur not only in the case of manual activation by the driver but also in the case of automated activation, in which the change in force cannot be adapted instantaneously either.

In this context it is assumed that the activation unit can be activated manually or in an automated fashion using the activation means, wherein different activation ranges, which are separated from one another by the jumps and/or inflection points, are defined by means of the activation characteristic, wherein different activation forces for activating the activation means are respectively set in the activation ranges.

The method can therefore advantageously be continuously carried out as soon as the activation means is activated, with the result that calibration can take place even when the activation unit is already mounted in the vehicle. For this purpose, the method merely accesses the activation travel and the activation speed or the activation speed characteristic variable, with the result that it is easy to carry out. As a result, the method can in particular be carried out after initial installation but also after retrofitting or during operation, in order to compensate for wear, i.e. when the activation characteristic has changed. Therefore, if the activation processes of the activation means are accessed, that is to say for the learning process, while the vehicle is operating, a costly calibration process before the initial start-up as in the prior art, e.g. at the end of the production line, can advantageously be dispensed with.

According to one preferred development there is provision that the activation speed is used directly as the activation speed characteristic variable, wherein the activation speed is preferably derived from the activation travel, in particular by deriving the activation travel and/or by forming a difference quotient. As a result, the method can be simplified further, since only the activation travel for the activation processes has to be continuously sensed, in order to infer the presence of jumps and/or inflection points. In this context, the time progression of the activation speed can already provide information about a change in the activation force on the basis of jumps and/or inflection points in the activation characteristic, for example if a falling or rising edge is present as a significant change in the time progression of the activation speed.

According to a further preferred embodiment, there is additionally or alternatively provision to use, as an activation speed characteristic variable, a speed acceleration which characterizes the change in the activation speed over time, and is therefore formed as a function of the activation speed. The activation acceleration can preferably be formed here from a derivative and/or a difference quotient of the activation speed or from a double derivative/difference quotient of the activation travel. The activation acceleration can advantageously also provide information about the extent of the change in the activation speed, with the result that in order to determine a significant change in the activation speed on the basis of jumps and/or inflection points it is possible to determine, for example, whether an acceleration maximum or an acceleration minimum is present for specific activation travel values, since maximum changes in the activation speed are to be expected at the jumps and/or the inflection points. The activation acceleration can therefore also provide definitive information as to whether significant changes occur in the activation speed.

It is also possible to combine different activation speed characteristic variables, in order e.g. to check the plausibility of a result. Therefore, activation travel values at which significant changes in the activation speed are derived from the activation speed can be compared with activation travel values for which significant changes in the activation speed follow from the activation acceleration, and can be correspondingly corrected, or vice versa.

According to a further embodiment there is provision that the activation travel is output by means of an activation signal generated by the activation unit as a function of the activation, wherein the activation travel is preferably sensed by means of a travel sensor, which in some way senses the deflection of the activation means on the basis of the activation. As a result, the activation travel or the activation speed characteristic variable following therefrom can be analyzed anywhere in the vehicle in order to determine the jumps and/or inflection points in the activation characteristic. According to one preferred development it is therefore possible that the method is not carried out in the activation unit. As a result, an evaluation module and/or even a memory unit can be dispensed with in the activation unit. Nevertheless, subsequent determination of the jumps and/or of the inflection points in the case of retrofitting or replacement of the activation unit is easily possible.

According to a further development there is provision that the activation characteristic is predefined by a spring characteristic curve, wherein the spring characteristic curve is determined by means of springs in the activation unit, wherein the springs counteract to differing extents an activation of the activation means in the respective activation areas, and jumps and/or inflection points on the spring characteristic curve are present between the activation areas. The spring characteristic curve covers here all the springs which influence the activation force which is to be applied. The activation unit can therefore also comprise pneumatic components in which springs which counteract the activation of the activation means are arranged. As a result, a specific pedal sensation or activation sensation is obtained, since different activation forces have to be applied in the different activation ranges. By means of the method, at least jumps and/or inflection points can be easily identified from this activation characteristic which is formed by the spring characteristic curve. The activation characteristic can also be specified in a comparable form differently than by means of a spring characteristic curve. The method can then also be used to identify jumps and/or inflection points in the activation characteristic which have an effect on the activation force.

There is preferably also provision that only the value pairs for which the activation travel lies in one specific activation interval and/or the activation speed lies in one specific speed interval and/or the activation acceleration lies in a specific acceleration interval are taken into account during the determination of the value pairs and/or during the checking for a significant change in the activation speed. Accordingly, only the activation processes in which a significant change in the activation speed is to be expected owing to a jump and/or an inflection point in the activation characteristic are taken into account. As a result, computational expenditure and demand for memory can be reduced, since irrelevant, or less relevant, events are ignored. The activation interval and/or the speed interval and/or the acceleration interval can be detected here, for example, on the basis of a standard activation characteristic with jumps and/or inflection points which usually occur for the respective type of activation unit, and which activation speeds and/or activation accelerations are to be expected therefrom.

Furthermore there is preferably provision that during the determination of the value pairs and/or during the checking for a significant change in the activation speed, recourse is made only to the value pairs for which the activation speed remains above a speed limiting value at least for a minimum activation interval. As a result it is detected that only those value pairs which result from at least partially continuous activation of the activation means and from which accordingly a significant change owing to a jump and/or inflection point in the activation characteristic can be determined are taken into account. As a result, computational expenditure and memory requirement can also be reduced, since irrelevant, or less relevant, events are ignored.

According to one preferred development there is provision that during the checking for significant changes in the activation speed it is ascertained whether a falling edge is present in the activation speed and/or a rising edge occurs in the activation speed. This corresponds to the fact that when the activation means is loaded or relieved of loading owing to a jump and/or inflection point in the activation characteristic, a change inevitably occurs in the activation speed.

There is further preferably provision that during the checking for a significant change in the activation speed it is ascertained at which activation travel value an acceleration maximum value or an acceleration minimum value is located. This can also be identified as a jump and/or as an inflection point in the activation characteristic, since the activation speed changes to a maximum extent in absolute value owing to the change in force. There can preferably be provision here for the acceleration maximum values and acceleration minimum values to be averaged in certain areas over a plurality of activation processes and for an averaged acceleration maximum value or acceleration minimum value to be output. The activation travel value which is assigned to the respective acceleration mean value can then in turn be assigned to a jump and/or inflection point in the activation characteristic. In this way the accuracy of the determination can be improved further.

In order to avoid incorrect detections owing to systematic outliers or noise on the signal, there can preferably be provision to filter, e.g. by means of a moving average, the time progression of the activation travel and/or the activation speed and/or the activation acceleration.

As an alternative to the evaluation of the activation acceleration or the activation speed for an individual activation process of the activation means, according to one preferred embodiment there can be provision that a histogram for the continuously formed value pairs of activation travel and activation speed or activation travel and activation acceleration is produced, wherein for each value pair which is formed a frequency of the occurrence of this value pair during the activation of the activation means is determined for this purpose, and this frequency is assigned to the value pair; and the histogram is assessed by checking whether value pairs accumulate for specific activation travel values, wherein the activation travel values at which value pairs accumulate are identified as significant changes in the activation speed, wherein these significant changes in the activation speed are assigned jumps and/or inflection points in the activation characteristic.

Therefore, value pairs are as it were combined with one another over a plurality of activation processes and as a result new information is used for the evaluation, the frequency of occurrence of a value pair. If a value pair is acquired more frequently for a specific activation travel value, the respective activation speed characteristic variable, i.e. the activation speed or the activation acceleration at this activation travel value occurs more frequently. This has the advantage that changes which occur repeatedly, i.e. with a high frequency, can be differentiated from random changes, i.e. with a low frequency, in the activation speed. These accumulating changes in the activation speed can be extracted from the activation speed itself, then in the form of frequently recurring points on a rising or falling edge, or from the activation acceleration, then in the form of frequently recurring acceleration maximum values or acceleration minimum values, in accordance with a pronounced change in the activation speed. Varying activation speeds which do not occur owing to jumps and/or inflection points, can therefore be correspondingly identified from the continuously determined activation speed and/or the continuously determined activation acceleration, since they occur with a lower frequency and are not taken into account.

There can preferably be provision that in the event that during the checking for a significant change in the activation speed no unambiguous indication of jumps and/or inflection points in the activation characteristic can be found from the histogram or from the value pairs of individual activation processes, because e.g. too few activation processes have occurred, in the first instance the standard activation characteristic is accessed, said characteristic corresponding e.g. to a standard spring characteristic curve in which the position of the jumps and/or inflection points are known.

According to a further embodiment there is provision that the activation of the activation means includes loading the activation means at least once and/or relieving the activation means of loading at least once, wherein different signs of the activation speed occur in the evaluation. The jumps and/or inflection points can be acquired here in both activation directions. In order to make savings in terms of computational expenditure, it is, however, also possible to consider just one direction.

According to one preferred development there is provision that after the determination of the jumps and/or inflection points in the activation characteristic a request characteristic curve of the braking requirement or of the drive requirement is produced, wherein the request characteristic curve assigns different dependencies between setpoint request (braking or acceleration) to be implemented to the activation ranges which are separated from one another by the jumps and/or inflection points, and to the correspondingly specified activation travel value. In the request characteristic curve, transition areas which follow from the sensed position of the jumps and/or inflection points are assigned to the activation travel values at which jumps and/or inflections points occur in the activation characteristic. As a result, the previously determined jumps and/or inflection points can be advantageously accessed, in order to detect which setpoint requests are to be modulated before and which after the transition areas as a function of the sensed activation travel value.

The present disclosure also provides an evaluation module for carrying out the method, wherein the evaluation module is designed:

- to continuously determine activation travel values of the activation means,
- to respectively assign an activation speed characteristic variable to the determined activation travel values, with the result that value pairs can be continuously formed from the determined activation travel and the assigned activation speed characteristic variable, wherein the activation speed characteristic variable can be formed as a function of the activation speed of the activation means at the respective activation travel, and
- on the basis of the value pairs which are formed it can be checked whether significant changes occur in the activation speed, wherein jumps and/or inflection points in the activation characteristic can be assigned to the activation travel values at which significant changes occur in the activation speed.

There is preferably provision here that the evaluation module is a component of a control device of a vehicle and/or is not arranged in the activation unit. The implementation can be carried out here by means of software and/or hardware, e.g. as software extension or hardware extension in the respective control unit.

According to the present disclosure, a vehicle having the evaluation module is also provided, wherein the vehicle has at least one activation unit, wherein the at least one activation unit is connected to the evaluation module via a communication path, in order to transmit the activation travel value to the evaluation module.

There is preferably provision here that the evaluation module is not arranged in the activation unit, and/or the evaluation module is a component of a control device. Accordingly, the method can preferably be executed outside the activation unit, with the result that the latter does not require an evaluation module or a memory unit for storing an activation characteristic curve.

The activation unit is preferably a brake activation unit with a foot-activated brake pedal or a manually activated parking brake lever or an anti jackknifing brake lever as activation means in an electrically controllable brake system and/or a drive activation unit with a drive pedal (accelerator pedal) as activation means of an electrically controllable drive system. However, further activation units and activation means are also possible. In this context, the term activation unit can be understood to refer to the entire unit composed of the activation means and components associated therewith. Therefore, at least all those components which influence the activation characteristic are included. In the case of an electropneumatic foot-operated brake valve for example this also includes the pneumatic components which can also have springs and can therefore participate in the activation characteristic. This also applies analogously to other types of activation.

According to FIG. 1, a vehicle 1, in particular utility vehicle 1, is illustrated which has an electrically controllable brake system 2 and an electrically controllable drive system 3. A brake activation unit 2*a* with a brake activation means 2*b*, for example a brake pedal or a parking brake lever or an anti jackknifing brake lever, is provided as part of the brake system 2, which part can be activated manually by a driver or in an automated fashion by an activation system and can in the process be deflected by a specific brake activation travel value sB. In a corresponding way, a drive activation means 3*b*, e.g. an accelerator pedal, a drive activation unit 3*a* of the drive system 3 can be deflected manually or in an automated fashion by a drive activation travel value sA. The respective activation travel value sB, sA can be determined by means of a travel sensor 2*c*, 3*c* in the respective activation unit 2*a*, 3*a*.

Depending on the respective activation travel value sB, sA, a brake activation signal BB or a drive activation signal BA is output to a brake evaluation module 2*d* or a drive evaluation module 3*d*. The brake evaluation module 2*d* can be here a component of a brake control device 2*e* (ECU), and the drive evaluation module 3*d* can be a component of a drive control device 3*e* (ECU). The respective control device 2*e*, 3*e* (ECU) serves here to perform superordinate control of the brake system 2 in order to implement a deceleration request (vehicle setpoint deceleration zSoll), or superordinate control of the drive system 3 in order to implement an acceleration request (vehicle acceleration aSoll). The evaluation modules 2*d*, 3*d* can, however, also be arranged at another location in the vehicle 1.

Figure 2A:
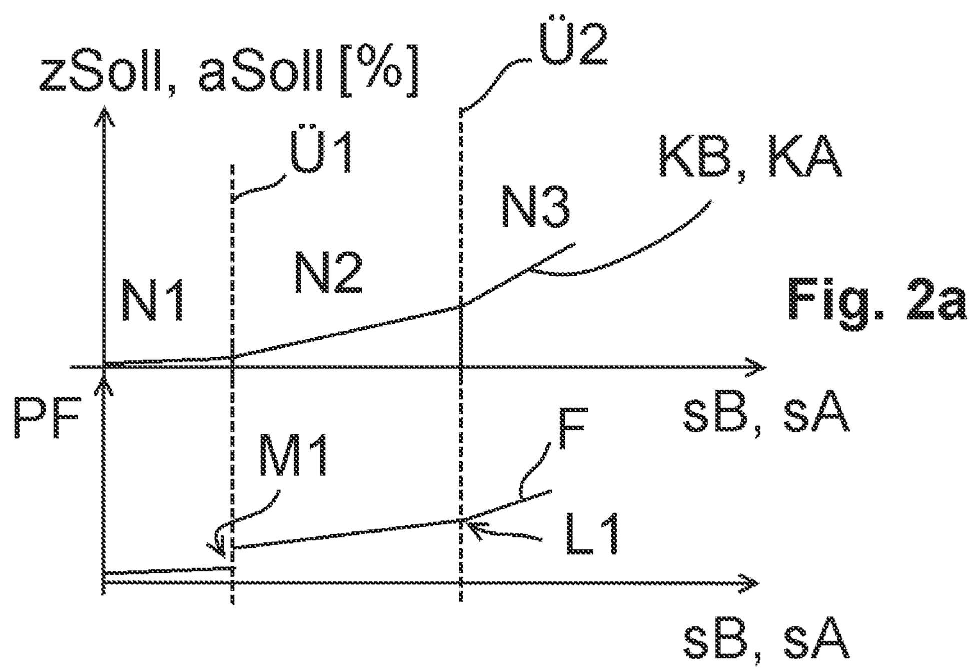
FIG. 2*a* illustrates an exemplary request characteristic curve for a specific spring characteristic curve.

An activation signal BB, BA, which characterizes or contains the respective activation travel value sB, sA, is transferred to the respective evaluation module 2*d*, 3*d* via a specific communication path 2*f*, 3*f* (in a wireless or wire-bound fashion). In order to implement a setpoint request zSoll, aSoll which corresponds to the activation travel value sB, sA, the respective evaluation module 2*d*, 3*d* accesses a stored request characteristic curve KB, KA (see FIG. 2*a*) which assigns a specific desired setpoint request zSoll, aSoll, e.g. a vehicle setpoint deceleration zSoll (brake system 2) or a vehicle setpoint acceleration aSoll (drive system 3) to the activation travel value sB, sA. This request characteristic curve KB, KA can be stored, for example, directly in the evaluation module 2*d*, 3*d* in a memory unit 2*g*, 3*g* or else in an external memory unit 4.

A braking request characteristic curve KB already takes into account here the activation characteristic F of the brake activation unit 2*a*. Accordingly, an activation characteristic curve is already included therein, wherein the activation characteristic curve indicates what activation force PF is to be applied at a specific brake activation travel value sB. This activation characteristic curve can have jumps Mi and/or inflection points Li at which the behavior of the brake activation unit 2*a* changes and which accordingly are also taken into account in the brake request characteristic curve KB. The changing behavior results here from a spring characteristic curve FK (see FIG. 2*a*) of the brake activation unit 2*a*, which also determines the activation characteristic F and which is defined by one or more springs 2*h* in the brake activation unit 2*a*, wherein the springs 2*h* counteract to differing extents the activation of the brake activation means 2*b*, depending on the brake activation travel value sB. In this context, any springs 2*h* which have effects on the activation characteristic F or the activation force PF which is to be applied are included in the spring characteristic curve FK. The brake activation unit 2*a* comprises all of these springs 2*h*.

Accordingly, depending on the number of jumps Mi and/or inflection points Li, different activation ranges Nk are defined, in each of which different activation forces PF are necessary to deflect the respective brake activation means 2*b*, said forces being opposed to the activation. As a result, a specific pedal sensation or activation sensation is obtained, wherein by means of the brake request characteristic curve KB it is possible to define what vehicle reaction or what vehicle setpoint deceleration zSoll is to follow in the respective activation ranges Nk in that a corresponding assignment is made. In the brake request characteristic curve KB, transition areas Üi, in which the individual activation ranges Nk merge with one another, are assigned to the jumps Mi and/or inflection points Li or the respective brake activation travel values sB at which they occur. The respective vehicle setpoint deceleration zSoll can then be output via a brake request signal SXB for implementation via the electronically controlled brake system 2.

The calibration of the brake activation signal BB therefore does not take place in the brake activation unit 2*a* itself by application of a previously learnt activation characteristic curve as in the prior art, but rather in the brake evaluation module 2*d* via a brake request characteristic curve KB which already automatically takes into account the activation characteristic curve. As a result, it is possible to dispense with a memory unit in the brake activation unit 2*a* as well as a previously executed calibration, as a result of which the space and cost requirements can be minimized.

The same also applies to the drive activation unit 3*a*, which has springs 3*h* and as a result forms a specific activation characteristic F according to a specific spring characteristic curve FK with jumps Mi and/or inflection points Li. The drive activation signal BA of the drive activation unit 3*a* is calibrated with transition areas Üi in the drive evaluation unit 3*d* by means of a drive request characteristic curve KA which takes into account the activation characteristic F, with the result that a vehicle setpoint acceleration aSoll which follows from this can be output via a drive request signal SXA for implementation by the drive system 3.

In order to ensure in these embodiments that when the activation unis 2*a*, 3*a* or the control devices 2*e*, 3*e* or the evaluation modules 2*d*, 3*d* are replaced there is a current request characteristic curve KB, KA which takes into account the specific jumps Mi and/or inflection points Li from the activation characteristic F or the activation characteristic curve of the respective activation unit 2*a*, 3*a*, there is provision for the request characteristic curve KB, KA to be learnt during the operation of the activation unit 2*a*, 3*a*. For this purpose, the activation travel value sB, sA which is set during manual or automated activation processes of the activation means 2*b*, 3*b* is analyzed in more detail.

Figure 2B:
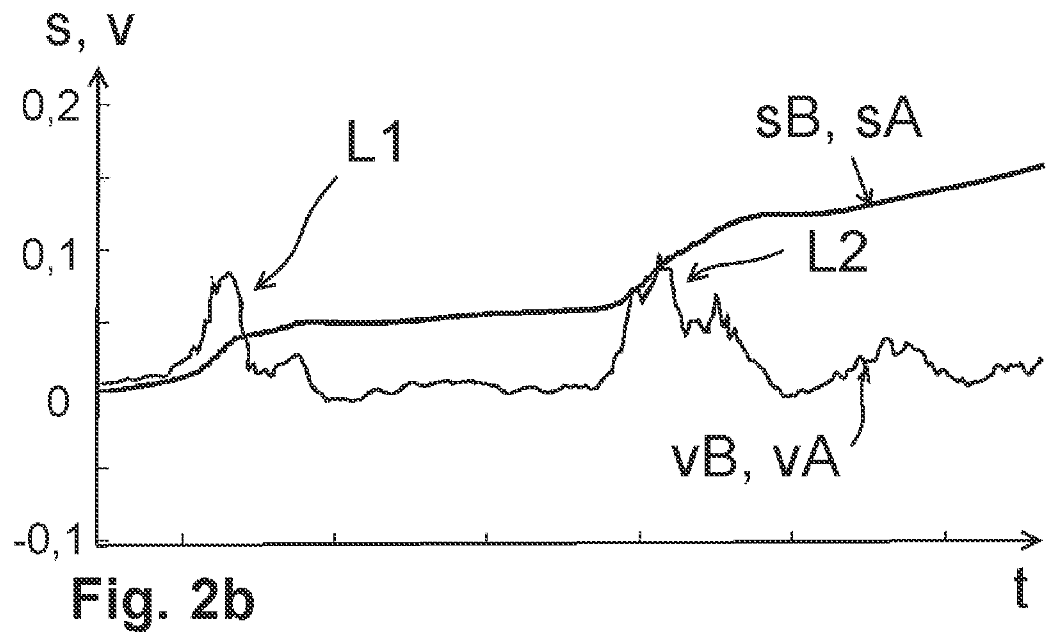
FIG. 2*b* illustrates characteristic curves following from activation signals.
Figure 3:
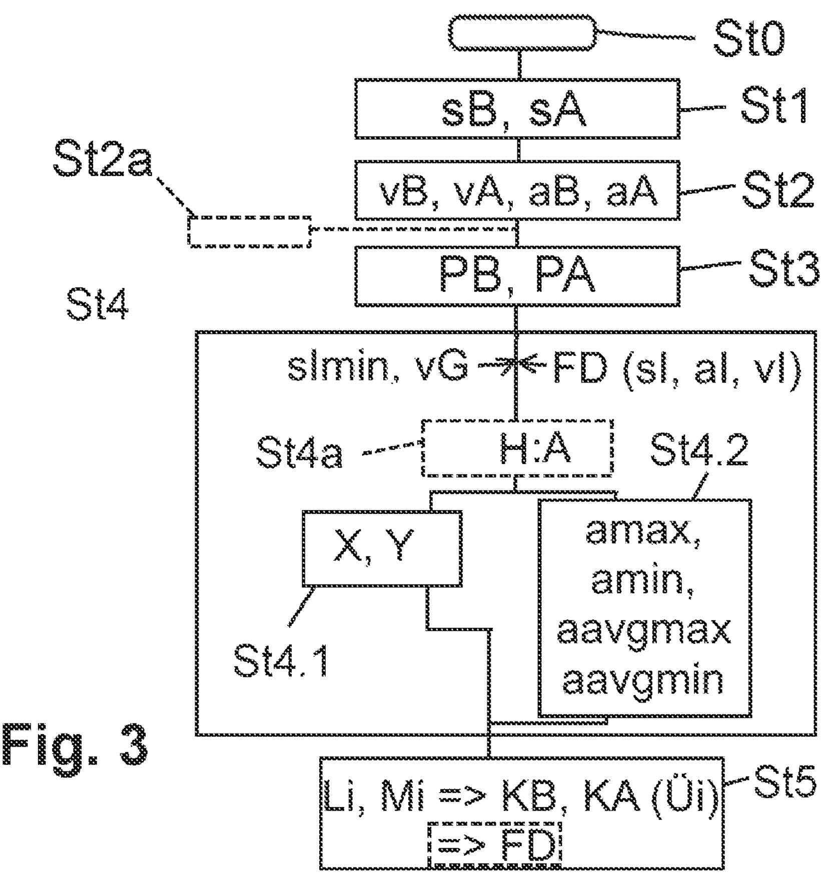
FIG. 3 illustrates a flow diagram of a method according to an embodiment.

In this context it has been recognized that when manual or automated activation of the respective activation means 2*b*, 3*b* is carried out by the driver or the activation system when the activation travel value sB, sA approaches one of the jumps Mi and/or inflection points Li in the activation characteristic F, i.e. when there is a change in the spring characteristic curve FK of the respective activation means 2*b*, 3*b*, at the same time changes also occur in an activation speed vB, vA of the respective activation means 2*b*, 3*b* (see FIG. 2*b*). This results from the fact that the driver and/or the activation system is generally not able to precisely maintain the activation speed vB, vA at the jumps Mi and/or inflection points Li of the activation characteristic F if the activation force PF which is to be applied changes. The driver can accordingly not immediately adapt to the change in force, wherein, for example when the activation force PF increases starting from one of the jumps Mi and/or inflection points Li, a reduction occurs in the activation speed vA, vB, and when the activation force PF decreases starting from one of the jumps Mi and/or inflection points Li an increase occurs in the activation speed vA, vB. In both cases the driver or the automated activation system does not expect a change in the activation characteristic F or the activation force PF to be applied, with this being manifest as a change in the activation speed vB, vA. Against this background, the learning process can be carried out according to FIG. 3 as follows:

In an initial step St0 the method is initialized, for example after a replacement of the activation unit 2*a*, 3*a* or after a specific time period, in order to counteract wear phenomena. In a first step St1, the respective activation travel value sB, sA is determined against the time t from the transferred activation signal BB, BA (see FIG. 2*b*). Subsequently, in a second step St2 the activation speed vB, vA and/or an activation acceleration aB, aA is then determined as an activation speed characteristic variable, for each activation travel value sB, sA e.g. by single and/or double derivation of the activation travel value sB, sA and/or by single and/or double formation of a difference quotient Q. When the respective activation means 2*b*, 3*b* is loaded, the activation speed vB, vA is positive, and when the respective activation means 2*b*, 3*b* is relieved of loading it is negative. In a simplified variant, it is also possible to consider only positive values for the activation speed vB, vA, i.e. only loading of the respective activation means 2*b*, 3*b*. Then, optional filtering of the derived signal can be carried out (St2*a*).

Each activation travel value sB, sA can then be assigned a specific activation speed characteristic variable, i.e. an activation speed vB, vA and/or an activation acceleration aB, aA, with the result that in a third step St3 value pairs PB(sB, vB/aB), PA(sA, vA/aB) can be formed from the acquired activation travel value sB, sA and the assigned activation speed vB, vA and/or activation acceleration aB, aA. Both the activation speed vB, vA and the activation acceleration aB, aA can be used here to evaluate the change in the activation speed vB, vA on the basis of a jump Mi and/or an inflection point Li at a specific activation travel value sA, sB.

Figure 2C:
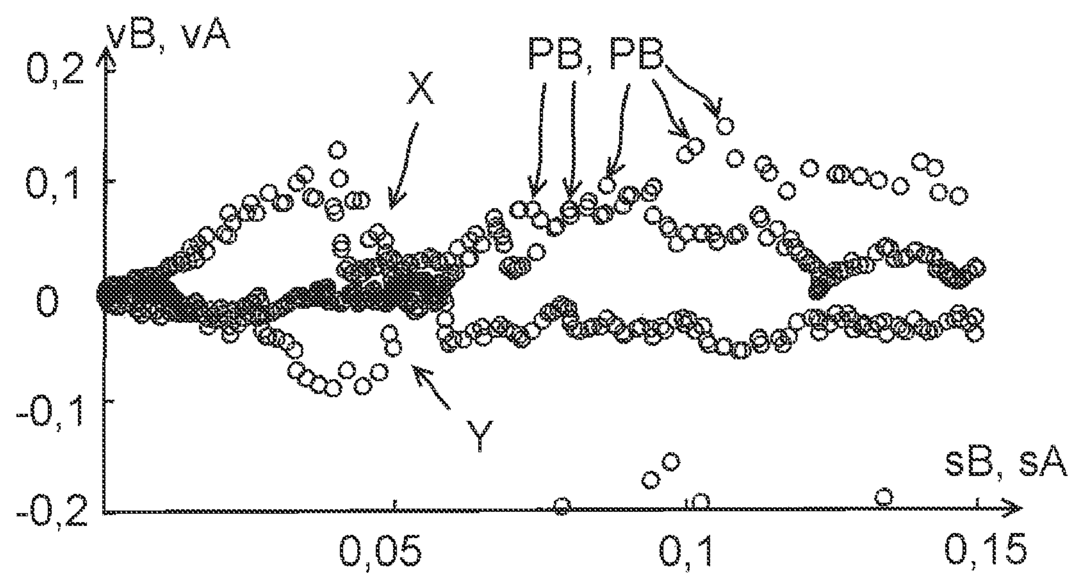
FIG. 2*c* illustrates a combination of the characteristic curves according to FIG. 2*b* from different measurements.

The value pairs PB, PA can be plotted according to FIG. 2*c*, wherein a point cloud occurs if a plurality of such value pairs PB, PA are plotted. Such value pairs PB, PA are continuously determined for one or more activation processes of the activation means 2*b*, 3*b*. In order to determine whether jumps Mi and/or inflection points Li are present in the activation characteristic F, firstly in a fourth step St4 there is provision to check, on the basis of the value pairs PB, PA which are formed, whether significant changes occur in the activation speed vB, vA.

This can be the case, for example, by virtue of the fact that in a first substep St4.1 for loading the respective activation means 2*b*, 3*b* it is determined whether a falling edge X (see FIG. 2*c*) is present in the activation speed vB, vA and/or for the relieving of loading of the respective activation means 2*b*, 3*b* it is determined whether a rising edge Y is present. This follows from the fact that during loading of the respective activation means 2*b*, 3*b* a reduction is to be expected in the activation speed vB, vA over a jump Mi and/or inflection point Li if the activation force PF increases at the jump Mi and/or at the inflection point Li in the loading direction, and when relieving of loading occurs over the same jump Mi and/or inflection point Li an increase is to be expected in the activation speed vB, vA, since the activation force PF decreases at the jump Mi or inflection point Li in the load-relieving direction. This occurs, as already described, owing to the inability of the driver to adapt the change in force. The respective edges X, Y can be determined here directly from the time progression of the activation speed vB, vA.

Additionally or alternatively, in a second substep St4.2 it is possible to detect by means of the activation acceleration aB, aA whether an acceleration maximum value a max or an acceleration minimum value a min occurs for specific activation travel values sB, sA. The activation travel value sB, sA at which an acceleration maximum value a max or an acceleration minimum value a min occurs can be identified as a jump Mi and/or as an inflection point Li in the activation characteristic F, since the activation speed vB, vA changes continuously and to a maximum extent in terms of absolute value owing to the change in force. In addition, an averaged acceleration maximum value aavg max or an averaged acceleration minimum value aavg min and the respectively assigned activation travel value sB, sA can also be determined over a plurality of activation processes, in order to determine the jumps Mi and/or inflection points Li and, if appropriate, also check their plausibility with the determination by means of the activation speed vB, vA.

Figure 2D:
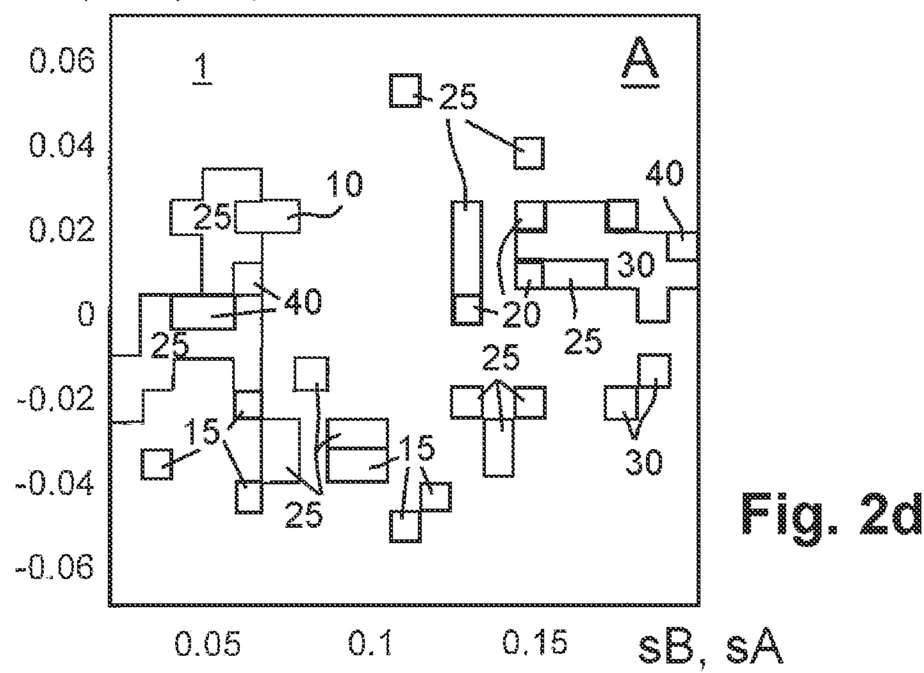
FIG. 2*d* illustrates a frequency distribution for the characteristic curves according to FIG. 2*c*.

In order to increase the quality of the evaluation it can be also additionally provided that in a predicted preliminary step St4*a* a histogram H is produced from the value pairs PB, PA which are formed, said histogram being illustrated for example in FIG. 2*d*. The histogram H indicates here a frequency distribution of the value pairs PB, PA, i.e. the frequency A with which a specific activation speed vB, vA and/or an activation acceleration aB, aA could be determined in the case of multiple activation of the activation means 2*b*, 3*b* with a specific activation travel value sB, sA. The higher the frequency A for a square or a specific value pair PB, PA in the histogram H, the higher the number given by way of example in FIG. 2*d*.

In all the evaluation variants it is possible preferably to take into account only specific value pairs PB, PA. For example, it is possible to use only the value pairs PB, PA at which the activation travel value sB, sA lies within an activation interval sl and/or the activation speed vB, vA lies within a speed interval vl and/or the activation acceleration aB, aA lies within an acceleration interval al. The activation intervals sl, vl, al can be defined here as a function of a standard activation characteristic FD with known jumps Mi and/or inflection points Li.

It is further possible to take into account whether a value pair PB, PA is associated with continuous activation of the activation means. For this purpose, the activation speed vB, vA can be monitored over a specific activation travel value sB, sA. If, for example, it is detected that the activation speed vB, vA remains above a speed limiting value vG at least for a minimum activation interval slmin, it is possible to infer continuous activation of the activation means. As a result, value pairs PB, PA for which a very slight change is to be expected in the activation speed vB, vA at one of the jumps Mi and/or inflection points Li or which cannot supply any indications of a jump Mi and/or inflection point Li, can be ignored when carrying out the assessment or check, as a result of which computing time and the memory requirement can be reduced.

Therefore, in a fifth step St5, it is possible to make, on the basis of the check, an assignment of jumps Mi and/or inflection points Li in the activation characteristic F to a specific activation travel value sB, sA at which a falling edge Y and/or a rising edge X and/or an acceleration maximum value a max and/or an acceleration minimum value a min and/or an averaged acceleration maximum value aavg max and/or an averaged acceleration minimum value aavg min occur. In the histogram H, relatively high frequencies A are to be expected here in the region of a falling edge Y and/or a rising edge X and/or an acceleration maximum value a max and/or an acceleration minimum value a min and/or an averaged acceleration maximum value aavg max and/or an averaged acceleration minimum value aavg min, since these values and/or value pairs PB, PA with these values of the activation speed characteristic variable are determined when there is multiple activation of the respective activation means 2*b*, 3*b* for a relatively large number of times. This can be correspondingly taken into account during the production of the request characteristic curve KB, KA in that the activation travel values sB, sA at which jumps Mi and/or inflection points Li have been detected are assigned to a transition area Üi in the request characteristic curve KB, KA. A specific change in the vehicle movement dynamics can be assigned to the activation ranges Nk between the jumps Mi and/or the inflection points Li or the transition areas Ük by defining a setpoint requirement zSoll, aSoll as a function of the activation travel sB, sA.

There can preferably also be provision that in the event of no unambiguous indication of jumps Mi and/or inflection points Li being able to be found in the activation characteristic F during the checking for a significant change in the activation speed vB, vA from the histogram H or from the value pairs PB, PA of individual activation processes of activation means, because e.g. too few activation processes occurred, access is made in the first instance to the standard activation characteristic FD which corresponds e.g. to a standard spring characteristic curve in which the positions of the jumps Mi and/or inflection points Li are known.

While the subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Vehicle
2 Electrically controllable brake system
2*a* Brake activation unit
2*b* Brake activation means
2*c* Travel sensor of the brake activation unit 2*a*
2*d* Brake evaluation module
2*e* Brake control device
2*f* Communication path in brake system
2*g* Brake memory unit
2*h* Spring in brake activation unit
3 Electrically controllable drive system
3*a* Drive activation unit
3*b* Drive activation means
3*c* Travel sensor of drive activation unit 3*a*
3*d* Drive evaluation module
3*e* Drive control device
3*f* Communication path in drive system
3*g* Drive memory unit
3*h* Springs in drive activation unit 3*a*
4 External memory unit
A Frequency
aSoll Vehicle setpoint acceleration
aB Brake activation acceleration
aA Drive activation acceleration
aI Acceleration interval
a max Acceleration maximum value
aavg max Averaged acceleration maximum value
a min Acceleration minimum value
aavg min Averaged acceleration minimum value
BA Drive activation signal
BB Brake activation signal
F Activation characteristic
FK Spring characteristic curve
FD Standard activation characteristic
H Histogram
KA Drive request characteristic curve
KB Brake request characteristic curve
Li Inflection points in activation characteristic
Mi Jumps in activation characteristic
Nk Activation ranges
PB, PA Value pairs
PF Activation force
Q Difference quotient
sA Drive activation travel
sB Brake activation travel
sI Activation interval
sI min Minimum activation interval
SXA Drive request signal
SXB Brake request signal
t Time
Üi Transition range in request characteristic curve KB, KA
vA Drive activation speed
vB Brake activation speed
vG Speed limiting value
vI Speed interval
X Falling edge
Y Rising edge
zSoll Vehicle setpoint deceleration
i,k Index
St1, St2, St3, Steps of the method
St4, St4*a*,
St4.1, St4.2,
St5

What is claimed is:

1. A method for determining transitions between respective activation regions an activation characteristic curve of an actuator, each respective activation region having a respective activation travel to activation force relationship, the method comprising:

continuously measuring, during activation of the actuator, activation travel values of the actuator to provide actuator travel against time;

calculating, from the actuator travel against time, activation speed characteristic values;

assigning, to each respective measured activation travel value, a respective activation speed characteristic value to form respective value pairs, each respective value pair including a respective measured activation travel value and a respective activation speed characteristic value;

determining, based on the respective value pairs, activation travel transition values, the activation travel transition values being measured activation travel values which are paired with activation speed characteristic values that exceed a speed characteristic threshold value, and determining, from the activation travel transition values, the transitions between the respective activation regions in the activation characteristic curve of the actuator.

2. The method as claimed in claim 1, wherein calculating the activation speed characteristic values comprises differentiating the actuator travel against time and/or by forming a difference quotient of measured activation travel values and time.

3. The method as claimed in claim 1, wherein the activation travel transition values correspond to a falling edge actuator speed against time and/or a rising edge in actuator speed against time.

4. The method as claimed in claim 1, wherein the activation speed characteristic values are activation acceleration values, wherein the activation acceleration values indicate a change in actuator speed against time, and wherein calculating the activation speed characteristic values comprises twice differentiating the actuator travel against time and/or by formation of a difference quotient of actuator speed values and time.

5. The method as claimed in claim 4, wherein the activation travel transition values correspond to an actuator acceleration maximum value or an actuator acceleration minimum value.

6. The method as claimed in claim 5, wherein actuator acceleration maximum values and actuator acceleration minimum values are averaged over a plurality of activation processes of the actuator, wherein determining activation travel transition values that correspond to activation speed characteristic values that exceed a speed characteristic threshold value is performed based on the respective value pairs and value pairs obtained from other activation processes of the plurality of activation processes, and wherein the activation travel transition values are determined to be actuator travel values at which an averaged acceleration maximum value or an averaged acceleration minimum value is located.

7. The method as claimed in claim 4, wherein the determined activation travel transition values are compared with second activation travel transition values, the second activation travel transition values being determined, based on respective second value pairs including a respective measured activation travel value and a respective second activation speed characteristic value, the second activation speed characteristic values being activation speed values, the second activation travel transition values being activation travel transition values that correspond to second activation speed characteristic values that exceed a speed characteristic threshold value, and wherein the determined activation travel transition values are adjusted based on the determined second activation travel transition values.

8. The method as claimed in claim 1, wherein the activation travel values of the actuator are measured by a travel sensor.

9. The method as claimed in claim 1, wherein the activation characteristic curve of the actuator is predefined by a spring characteristic curve, wherein the spring characteristic curve is determined by springs associated with the actuator, wherein the springs counteract to differing extents an activation of the actuator in the respective activation regions, and inflection points on the spring characteristic curve are present between the activation regions.

10. The method as claimed in claim 1, further comprising, prior to the determining, based on the respective value pairs, the activation travel transition values, excluding, from the respective value pairs, all value pairs for which a respective measured activation travel value lies outside one or more specified activation travel value intervals and/or all value pairs for which and a respective activation speed characteristic value lies outside one or more specified activation speed characteristic value intervals.

11. The method as claimed in claim 10, wherein the one or more specified activation travel value intervals and/or the one or more specified activation speed characteristic value intervals are/is defined as a function of a standard activation characteristic for the actuator.

12. The method as claimed in claim 1, further comprising, prior to the determining, based on the respective value pairs, the activation travel transition values, excluding, from the respective value pairs, all value pairs for which the absolute value of the actuator speed remains below a speed limiting value at least for a minimum activation travel value interval.

13. The method as claimed in claim 1, further comprising:

producing a histogram from the respective value pairs, wherein, for each respective value pair, a frequency of occurrence of the respective value pair during the activation of the actuator is determined and assigned to the value pair, wherein determining, based on the respective value pairs, activation travel transition values that correspond to activation speed characteristic values that exceed a speed characteristic threshold value comprises assessing the histogram to determine value pairs that have been assigned a frequency that exceeds a threshold frequency.

14. The method as claimed in claim 1, wherein determining, based on the respective value pairs, activation travel transition values that correspond to activation speed characteristic values that exceed a speed characteristic threshold value comprises determining activation transition values of a standard activation characteristic curve of the actuator.

15. The method as claimed in claim 1, further comprising:

producing, based on the determined transitions between respective activation regions in the activation characteristic curve of the actuator, a vehicle dynamics request characteristic curve, wherein the vehicle dynamics request characteristic curve assigns different dependencies of setpoint vehicle dynamics requests to the respective activation regions of the activation characteristic curve of the actuator.

16. An evaluation module configured to carry out the method as claimed in claim 1.

17. A vehicle comprising:

the evaluation module as claimed in claim 16, and the actuator, wherein the actuator is connected to the evaluation module via a communication path, the communication path being configured to transmit the measured activation travel values to the evaluation module.

18. The vehicle as claimed in claim 17, wherein the evaluation module is not arranged in an activation unit, and/or the evaluation module is a component of a control device of the vehicle.

19. The vehicle as claimed in claim 17, wherein the actuator is a brake actuator of an electrically controllable brake system and/or a drive actuator of an electrically controllable drive system.

20. The method as claimed in claim 1, wherein each respective activation region has a respective activation travel to activation force relationship provided by respective different activation force functions of activation travel being present in each respective activation region.

* * * * *